United States Patent [19]

Martin

[11] 4,278,158
[45] Jul. 14, 1981

[54] FLUID-FRICTION CLUTCH

[75] Inventor: Hans Martin, Stuttgart, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 27,327

[22] Filed: Apr. 5, 1979

[30] Foreign Application Priority Data

Apr. 5, 1978 [DE] Fed. Rep. of Germany ....... 2814608

[51] Int. Cl.³ ............................................. F16D 35/00
[52] U.S. Cl. ................................ 192/58 B; 192/82 T
[58] Field of Search ............................ 192/82 T, 58 B

[56] References Cited

U.S. PATENT DOCUMENTS

| | | | |
|---|---|---|---|
| 3,236,346 | 2/1966 | Roper . | |
| 3,259,221 | 7/1966 | Godfrey | 192/58 B |
| 3,268,041 | 8/1966 | Roper | 192/58 B |
| 3,964,582 | 6/1976 | Mitchell . | |
| 3,983,981 | 10/1976 | Snodgrass et al. | 192/82 T |
| 4,051,936 | 10/1977 | Crisenberg et al. . | |
| 4,086,988 | 5/1978 | Spence | 192/58 B |
| 4,086,989 | 5/1978 | Spence . | |

FOREIGN PATENT DOCUMENTS

| | | |
|---|---|---|
| 1235075 | 2/1967 | Fed. Rep. of Germany . |
| 2407062 | 8/1974 | Fed. Rep. of Germany . |
| 2532201 | 2/1976 | Fed. Rep. of Germany . |
| 2723429 | 12/1977 | Fed. Rep. of Germany . |
| 2750520 | 5/1978 | Fed. Rep. of Germany . |
| 712476 | 7/1954 | United Kingdom . |
| 817021 | 7/1954 | United Kingdom . |
| 914580 | 6/1963 | United Kingdom . |
| 1158689 | 7/1969 | United Kingdom . |
| 1424372 | 2/1976 | United Kingdom . |

*Primary Examiner*—Kenneth Downey
*Attorney, Agent, or Firm*—Schwartz, Jeffery, Schwaab, Mack, Blumenthal & Koch

[57] ABSTRACT

A temperature-controlled, fluid-friction clutch filled with a viscous fluid. The clutch has a drive disk mounted for rotation, the disk being flexible in the direction of the rotational axis. First and second clutch-driven plates have respective co-planar drive surfaces facing and spaced apart from surfaces of the drive disk, the space between the clutch-driven plates defining a fluid working space. A fluid storage space is also defined and an element is provided for pumping fluid from the working space into the storage space. A temperature-controlled valve controls flow of fluid between the working space and the storage space.

9 Claims, 10 Drawing Figures

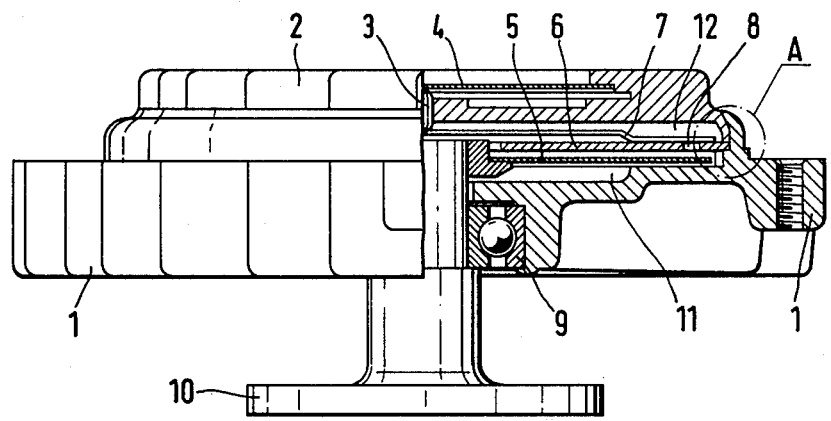
FIG. 1
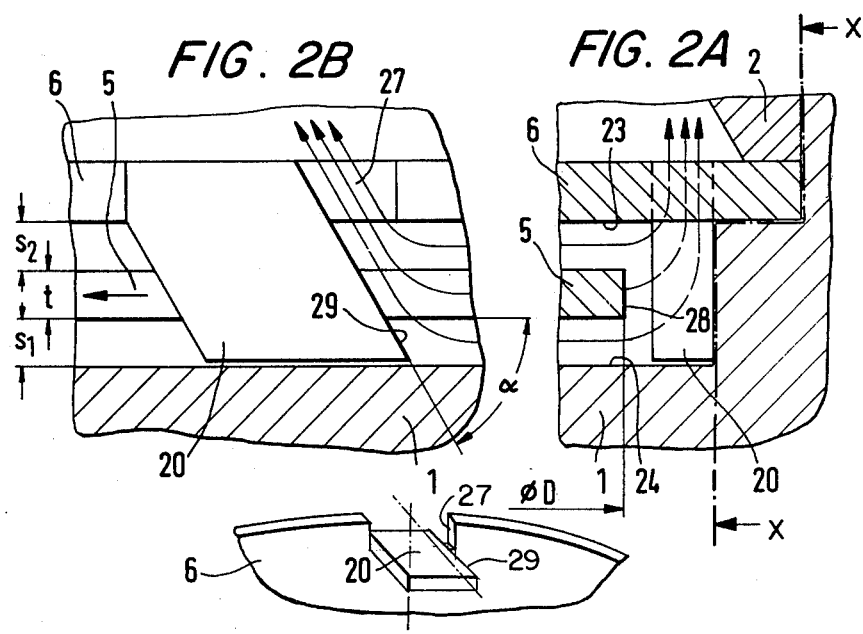
FIG. 2B
FIG. 2A
FIG. 2C

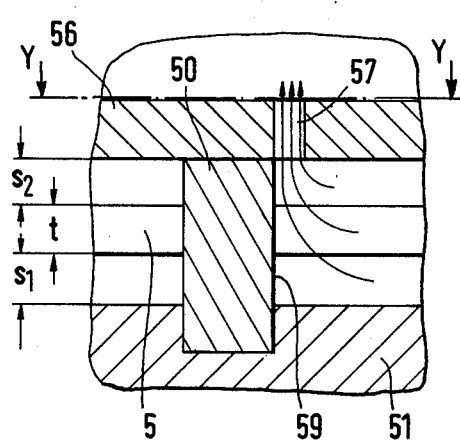
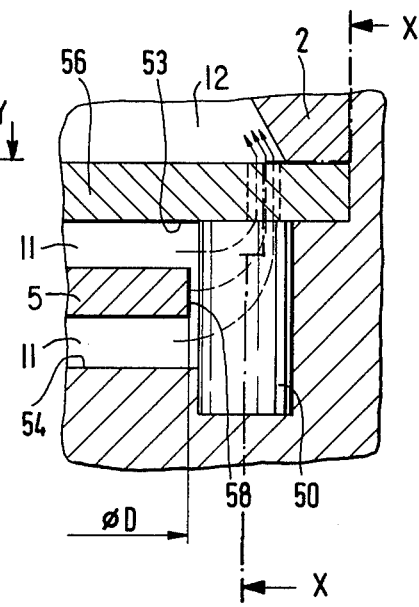
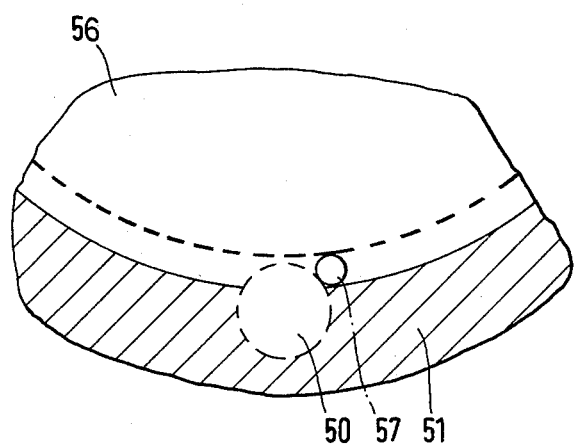

FLUID-FRICTION CLUTCH

BACKGROUND OF THE INVENTION

1. Field of the Invention

The invention relates to a temperature-controlled clutch filled with a viscous fluid, that is, a fluid-friction clutch. Spacings for generation of power-transmitting viscous forces are provided between a drive disk fastened on the primary (driving) side of the clutch and clutch-driven surfaces arranged on the secondary (driven) side of the clutch.

2. The Prior Art

One problem encountered in such fluid-friction clutches is that of maintaining constant the spacing between the driving and the driven surfaces for transfer of the torque. Any variation of the spacing, which is of utmost importance in relation to the viscous forces, causes the torque transmitted by the clutch to vary. Variation in the transmitted torque leads to uncontrollable and undesirable deviations from the nominal rotational velocity, both when the clutch is engaged and during idling.

Known clutches are equipped with a drive disk rigidly mounted on the primary (driving) side, from which torque is transmitted through the spacing to the drive surface of a housing on the secondary (driven) side of the clutch. In German published application No. DE-OS 27 23 429, the spacings are formed by labyrinth-like, concentrically-interacting surfaces. To assure that the effective spacings are maintained constant, dimensional tolerances must be closely held for both the driving and the driven surfaces. This is not always attainable in manufacture and assembly, and therefore a planar eccentricity of the drive disk with respect to the driven housing must be expected. This also affects the spacing between the drive disk and a pumping element arranged in a position axially offset from the driven surface on the secondary side of the clutch. To the extent that this spacing is affected, uniform pumping of the fluid is not assured and deviations from the desired clutch characteristic result during idling. German published application No. DE OS 24 07 062 discloses a similar clutch in which the spacings provided for the transmission of torque consist of theoretically plane parallel surfaces. Again, however, a variation of the spacing due to manufacture and assembly conditions leads to deviation in the transmitted torque and, thus, a resultant deviation in operation of the rotational velocity from nominal values. In this case as well, pumping by means of the pumping element axially offset with respect to the drive disk is not assured in a controllable fashion. Finally, German published application No. DE OS 25 32 201 describes a spring-loaded, axially-offset pumping element, the pumping element being pressed constantly against the rigid drive disk. While the gap between the drive disk and the pumping element has been eliminated in this arrangement, this type of clutch is applicable only up to a limited rotational velocity. If this velocity is exceeded, the resonant frequencies of the pumping element-spring system no longer permit the pumping element to be constantly pressed against the drive disk.

SUMMARY OF THE INVENTION

It is therefore an object of the present invention to avoid the above-mentioned disadvantages and to provide an improved fluid-friction clutch having a narrower range of rotational velocity deviations. In particular, it is the object of the invention to narrow the rotational velocity-deviation range both when the clutch is engaged (during the transmission of torque) and during idling (negligible torque transmission).

The fluid-friction clutch of the present invention employs a drive disk on the primary (driving) side of the clutch which is flexible in the direction of its axis of rotation. This makes it possible to maintain constant the spacing between the drive disk on the primary (driving) side and the clutch-driven plates on the secondary (driven) side, because the flexible drive disk is capable of following inaccuracies in planar parallelism and, thus, spacing between the clutch-driven plates. Because the drive disk is flexible, it will always position itself midway between the two clutch-driven plates, resulting in constant and equal spacings and thus in uniform torque transmission and constant and controlled rotational velocity. A ratio of the thickness t to the external diameter D of the drive disk of $t/D \leq 0.015$ yields a preferred measure of the flexibility of the disk when the disk is made of steel having a known modulus of elasticity.

Obviously, the drive disk may also be made of a suitable material other than steel, in which case the ratio $t/D$ must be correlated with the modulus of elasticity of such material to insure the necessary flexibility. The characteristic of flexibility primarily serves to prevent deviations in rotational velocity of the operating state (i.e. when torque is being transmitted from the driving to the clutch-driven plates), particularly an increase in velocity. A rotational velocity increase leads to increased, undesirable generation of noise, as well as to loss of the power generated by the driving engine and to increased stresses in parts rotating at the higher velocity. Increased stresses in the parts can result in disintegration thereof.

In one form of the invention, a baffle plate is provided at a location at or near the outer circumference of the drive disk, insuring the controlled and largely complete pumping out of the working medium. The working medium may be any viscous fluid suitable for the purpose, as will be recognized by those skilled in the art. This baffle-plate arrangement eliminates any dependence on a spacing variable in the axial direction. Because the baffle plate is located at the outermost periphery of the drive disk, the space in which the viscous fluid works to transmit torque is pumped out to a large extent, so that the rotational velocity of the clutch is controlled, even during idling. An embodiment which is particularly advantageous from a manufacturing standpoint has the baffle plate integrally formed with one of the clutch-driven plates. The baffle plate in this embodiment is produced by bending over a flap which extends outwardly from one of the clutch-driven plates. In another form of the invention, the baffle plate may be formed non-integrally with the clutch-driven plate, and may be in the form of a pin, to be held in a suitable recess in one of the clutch-driven plate surfaces. The deflecting surface of the baffle preferably forms an acute-to-right angle with the plane of rotation of the drive disk and an obtuse-to-right angle with the local peripheral direction of the drive disk and the entrained working medium, respectively. This arrangement produces a particularly strong pumping action for the working medium. Enlargement of the peripheral surface area of the drive disk further enhances the pumping action, because an increased volume of the working medium is entrained as a result of an increase in the local circumferential velocity of the working medium.

BRIEF DESCRIPTION OF THE DRAWINGS

FIG. 1 shows a partially cut-away top view of the clutch according to a first embodiment of the invention;

FIG. 2A shows a detail view at A of FIG. 1;

FIG. 2B shows a right-side, partial cut-away view taken along line X—X of FIG. 2A;

FIG. 2C shows in perspective view a part of a clutch-driven plate according to the first embodiment of the invention having an integrally-formed baffle;

FIG. 5A shows a detail view similar to FIG. 4A and illustrating a third embodiment of the present invention;

FIG. 5B shows a partial, sectional view taken along line X—X of FIG. 5A; and

FIG. 5C shows a partial, sectional view taken along Y—Y of FIG. 5B.

THE PREFERRED EMBODIMENTS

Figure 3:
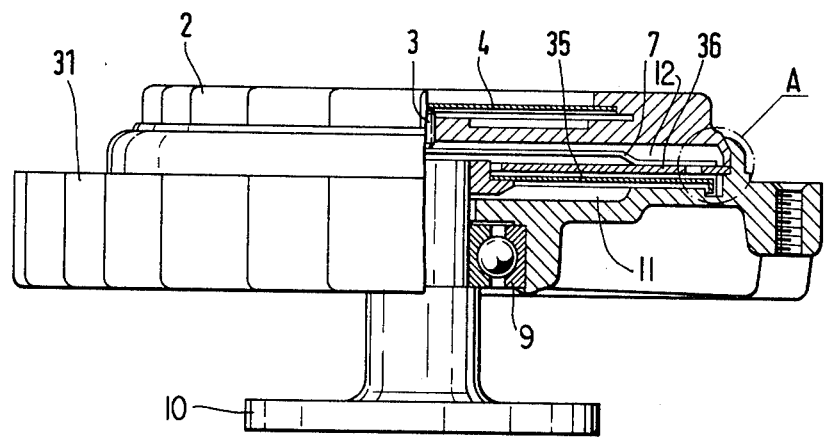
FIG. 3 shows a partially cut-away top view of the clutch according to a second embodiment of the invention.

FIG. 1 shows a fluid-friction clutch improved according to a first embodiment of the present invention. The clutch is such as may be used in automotive vehicles for the powering of fans. The primary (driving) side of the clutch comprises a flanged shaft 10 and a drive disk 5 mounted fixedly on shaft 10 with respect to rotation. Drive disk 5 rotates in a working space 11, space 11 being filled with a working medium such as a suitable viscous fluid. Working space 11 is defined by the internal wall of housing 1 and one surface of an intermediate disk 6 rigidly joined with the housing. Flanged shaft 10 and drive disk 5 represent the primary (driving) side of the clutch. Housing 1, supported on flanged shaft 10 by means of a rotating bearing, together with intermediate disk 6 secured fixedly with respect to rotation to housing 1, form the secondary (driven) side of the clutch. Intermediate disk 6 and housing 1 can be considered as comprising a pair of clutch-driven plates. Cover 2, also connected to housing 1, contains a bimetallic element 4 exposed to the cooling air drawn over the clutch by a fan blade or the like (not shown). Bimetallic element 4 operates an actuating pin 3, which in turn controls a valve lever 7 so that bore 8 in intermediate disk 6 is alternately opened or closed, thus opening or closing communication between working space 11 and a space 12 for the storage of the working medium. By this way flow from storage space 12 to working space 11 is controlled. For example, the valve 7 is closed when cooling air temperature is about 23° Celsius, and valve 7 opens when air temperature exceeds about 60°–70° Celsius.

FIG. 2A shows the detail A of FIG. 1. In particular, FIG. 2A shows an embodiment of the present invention in which baffle 20 is integrally formed with intermediate disk 6 and is bent at a right angle from the plane of intermediate disk 6, in the form of a flap. FIG. 2B shows a partial cut-away view taken along line X—X of FIG. 2A, and presents an edge view of intermediate disk 6 and of drive disk 5. Further, intermediate disk 6 with baffle 20 is shown in perspective view in FIG. 2C. The intermediate disk 6, as mentioned above, is rigidly connected against rotation with respect to housing 1, whereby housing 1 and intermediate disk 6 receive the torque transmitted by drive disk 5 through the intermediary of driven surfaces 23 and 24 of intermediate disk 6 and housing 1, respectively. Between the external surfaces of drive disk 5 and the two clutch-driven plate surfaces 23 and 24, respective spacings S2 and S1 are provided, as indicated in FIG. 2B. The deflecting surface 29 of baffle 20 forms an angle with the planes of rotation of drive disk 5 and clutch-driven surfaces 23, 24. Angle α is preferably between 30° and 90°. The working medium is forced radially outwardly of the axis of rotation by centrifugal force, and pumped by means of deflecting surface 29 of baffle 20 through opening 27, so that the working medium is pumped in a continuous flow into storage space 12. As long as the valve 7 is opened the working medium reenters the working space 11 through bore 8. The arrow indicated on the edge view of drive disk 5 in FIG. 2B indicates the direction of rotation of drive disk 5.

The flexible construction of drive disk 5 insures that spacings S1, S2 remain approximately equal, so that uniform torque transmission is achieved. The theory of fluid-friction clutches yields the following expression for the torque transmitted in the case of two effective gaps S1, S2;

$$M_{total} = C/S1 + C/S2$$

Where C is a constant value depending on geometry of disk 5, on oil characteristics and on speed of rotation. Because the sum of S1 and S2 remains constant, substantial changes in torque occur when S1 and S2 vary. Such changes may amount to 10 to 30% of the nominal torque value. The function given above for transmitted torque demonstrate the importance of maintaining constant the spacings in order to assure constant torque transmission. This requirement is satisfied by means of the flexible drive disk 5.

Figure 4B:
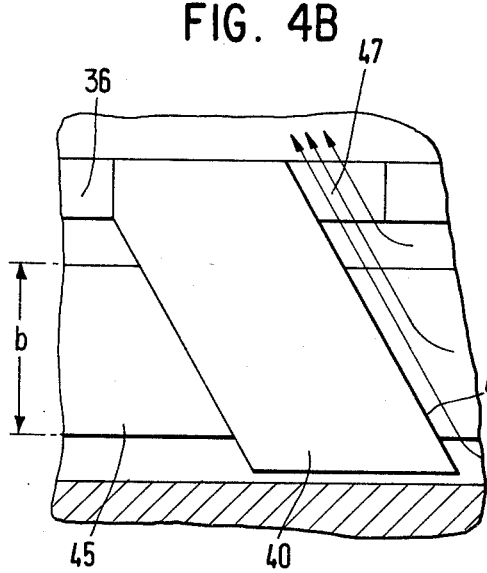
FIG. 4B shows a partial, sectional view taken along line X—X of FIG. 4A.
Figure 4A:
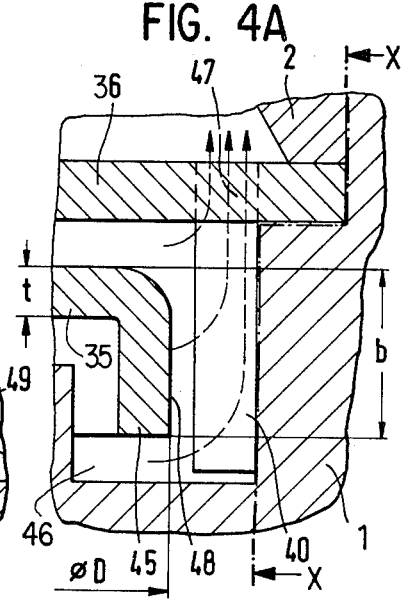
FIG. 4A shows a detail view taken at A of FIG. 3.

FIG. 3 illustrates a second advantageous embodiment of the clutch according to the present invention. FIG. 4A shows the detail A of FIG. 3, while FIG. 4B is a partial sectional view taken along line X—X of FIG. 4B. The clutch shown in FIG. 3 is substantially the same as the clutch of FIG. 1, except that housing 1, drive disk 5, and intermediate disk 6 have been replaced with respective, slightly-altered components 31, 35, and 36. The differences between FIGS. 1 and 3 may be more readily seen by a comparison of the details of FIGS. 2A and 4A.

In FIG. 4A, it can be seen that drive disk 35 has an inner disk portion of thickness t and that at the outer periphery of drive disk 35 is provided a cylindrical portion 45 which extends axially outwardly from the periphery of drive disk 35. The outer surface of the cylindrical portion 45 of drive disk 35 is indicated by reference 48. The cylindrical portion 45 of drive disk 35 has an axial dimension b. In general, dimension b is larger than thickness t of the inner portion of drive disk 35. It can be further seen from FIG. 4A that an annular depression 46 is provided in housing 31 for receiving the outer cylindrical portion 45 of drive disk 35. FIGS. 4A and 4B further show a modified baffle 40 for directing the working medium from working space 11 through opening 47 at the outer periphery of modified intermediate disk 36 into the storage space 12. Surface 49 of baffle 40 serves to direct the working medium toward and into opening 47. It will be seen that the enlarged circumferential area 48 of drive disk 35, along with the enlarged baffle 40, serves to more rapidly and completely pump the working medium out of the working space so that a constant, driven rotational velocity of the secondary side of the clutch is established, particularly in the idling state.

FIGS. 5A, 5B, and 5C show yet another embodiment of the invention, in which a modified intermediate disk 56 is provided, disk 56 having no integrally-formed baffle. FIG. 5A is a detail view similar to those of FIGS. 2A and 4A, and FIG. 5B is taken along line X—X of FIG. 5A.

An opening 57 near the edge of intermediate disk 56 allows the working medium to pass from working space 11 to storage space 12. A baffle 50 is provided, the baffle being formed in the shape of a pin having a circular cross-section. The pin is held in a bore in modified housing 51 and secured by intermediate disk 56 against axial displacement. Surface 59 of baffle 50 serves to direct the working medium toward opening 57 in intermediate disk 56. In FIG. 5B, the arrow shown on drive disk 5 indicates the direction of rotation of such disk.

FIG. 5C shows a partial, cut-away view taken along line Y—Y of FIG. 5B. As can be seen from FIG. 5C, opening 57 is offset with respect to the axis of baffle 50, such that the flow of working medium toward opening 57 is enhanced.

I claim:

1. A temperature-controlled, fluid-friction clutch filled with viscous fluid, comprising:
   a drive disk mounted for rotation about an axis, said disk being flexible in the direction of said axis;
   first and second clutch-driven plates mounted for rotation about said axis, said plates having respective co-planar drive surfaces facing and spaced apart from respective surfaces of said drive disk, the space between said clutch-driven plates defining a fluid working space;
   means defining a fluid storage space adjacent said first clutch-driven plate;
   means extending from one said clutch-driven plate into said working space for pumping said viscous fluid from said working space into said storage space; and
   temperature-controlled valve means operatively connected for controlling flow of said viscous fluid between said working space and said storage space.

2. The clutch according to claim 1, wherein said drive disk has a thickness t, an outer diameter D, and a ratio of thickness-to-diameter $t/D \leq 0.015$, said drive disk being constructed of a material having a modulus of elasticity E on the order of magnitude of $2.1 \times 10^5$ N/mm$^2$.

3. The clutch according to claim 1, wherein said pumping means comprises:
   a baffle extending into said working space; and
   an opening in said first clutch-driven plate adjacent said baffle.

4. The clutch according to claim 3, wherein said baffle is integrally formed with said one clutch-driven plate and comprises a flap bent to an angle non-parallel with the drive surface of said one clutch-driven plate.

5. The clutch according to one of claims 3 or 4, wherein said baffle includes a surface for deflecting said viscous fluid through said opening, said deflecting surface forming an angle of between 30° and 90° with the plane of rotation of said drive disk about said axis.

6. The clutch according to claim 3, wherein said baffle comprises a pin of circular cross-section and held in a bore in said one clutch-driven plate.

7. The clutch according to claim 1, wherein said drive disk comprises a central portion in the form of a flat disk having an outer periphery, and an outer portion in the form of a cylinder extending axially outwardly from said outer periphery.

8. The clutch according to claim 7, wherein said drive disk central portion has a thickness t, said drive disk outer portion has a dimension b in the axial direction, and dimension b is substantially larger than thickness t.

9. The clutch according to one of claims 1, 2 or 3, wherein said drive disk has a circumferential edge, and said pumping means is located in said working space radially outboard of said circumferential edge.

* * * * *